(12) United States Patent
Dhaens et al.

(10) Patent No.: US 11,084,349 B2
(45) Date of Patent: Aug. 10, 2021

(54) LEAF SPRING AND ACTUATOR CONTROL SYSTEMS AND METHODS

(71) Applicant: Tenneco Automotive Operating Company Inc., Lake Forest, IL (US)

(72) Inventors: Miguel Dhaens, Lommel (BE); Monzer Al Sakka, Sint-Truiden (BE); Emilie Boulay, Cortil-Wodon (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 132 days.

(21) Appl. No.: 16/263,287

(22) Filed: Jan. 31, 2019

(65) Prior Publication Data

US 2020/0247207 A1 Aug. 6, 2020

(51) Int. Cl.
*B60G 17/016* (2006.01)
*B60G 11/34* (2006.01)
*B60G 15/04* (2006.01)

(52) U.S. Cl.
CPC ............ *B60G 17/016* (2013.01); *B60G 11/34* (2013.01); *B60G 15/04* (2013.01); *B60G 2202/114* (2013.01); *B60G 2202/422* (2013.01); *B60G 2400/51* (2013.01)

(58) Field of Classification Search
CPC ...... B60G 17/016; B60G 15/04; B60G 11/34; B60G 2202/422; B60G 2202/114; B60G 2400/51
See application file for complete search history.

(56) References Cited

U.S. PATENT DOCUMENTS

| | | | | |
|---|---|---|---|---|
| 2,402,562 | A | * 6/1946 | Lewis | B60G 3/24 180/254 |
| 4,753,456 | A | 6/1988 | Booher | |
| 4,861,067 | A | * 8/1989 | Booher | B60G 3/10 280/5.515 |
| 4,997,202 | A | * 3/1991 | Kitagawa | B60G 17/0275 280/124.14 |
| 5,141,209 | A | 8/1992 | Sano et al. | |
| 5,500,798 | A | * 3/1996 | Inagaki | B60G 17/016 280/5.507 |
| 5,573,088 | A | 11/1996 | Daniels | |
| 6,029,987 | A | 2/2000 | Hoffman et al. | |
| 6,390,486 | B1 | 5/2002 | Boes et al. | |

(Continued)

FOREIGN PATENT DOCUMENTS

| | | |
|---|---|---|
| DE | 60102492 T2 | 3/2005 |
| DE | 102009002939 A1 | 11/2010 |

(Continued)

OTHER PUBLICATIONS

International Search Report and Written Opinion for Application No. PCT/US2020/015880, dated May 25, 2020.

*Primary Examiner* — Frank B Vanaman
(74) *Attorney, Agent, or Firm* — Harness, Dickey & Pierce, P.L.C.

(57) ABSTRACT

A suspension system of a vehicle includes: an unsprung mass of a vehicle; a sprung mass of the vehicle; at least one transverse leaf spring coupled between the unsprung mass of the vehicle and the sprung mass of the vehicle; and a linear actuator coupled in parallel with the at least one transverse leaf spring between the unsprung mass of the vehicle and the sprung mass of the vehicle and configured to modify vibrational characteristics of the vehicle.

17 Claims, 9 Drawing Sheets

(56) References Cited

U.S. PATENT DOCUMENTS

| | | |
|---|---|---|
| 6,811,169 B2 | 11/2004 | Schroeder et al. |
| 6,952,060 B2 | 10/2005 | Goldner et al. |
| 7,029,017 B2 | 4/2006 | Zandbergen et al. |
| 7,823,891 B2 | 11/2010 | Bushko et al. |
| 8,662,266 B2 | 3/2014 | Kim |
| 9,707,814 B2 | 7/2017 | Zuckerman et al. |
| 2003/0122338 A1* | 7/2003 | Carlstedt ............... B60G 21/05 280/124.134 |
| 2004/0173984 A1 | 9/2004 | Hildebrand |
| 2005/0279244 A1* | 12/2005 | Bose .................. B60G 17/018 105/199.2 |
| 2006/0273530 A1 | 12/2006 | Zuber |
| 2011/0218707 A1* | 9/2011 | Inoue .................. B60G 17/06 701/37 |
| 2013/0241168 A1 | 9/2013 | Michel |
| 2014/0246820 A1* | 9/2014 | Chen .................... B60N 2/50 267/140.11 |
| 2014/0345958 A1* | 11/2014 | Lavarack .............. B60G 11/12 180/55 |
| 2015/0015352 A1* | 1/2015 | Satou ................... H01F 7/1615 335/229 |
| 2015/0191067 A1* | 7/2015 | Liu ...................... B60G 13/04 701/37 |
| 2018/0370315 A1 | 12/2018 | Higle |

FOREIGN PATENT DOCUMENTS

| | | |
|---|---|---|
| DE | 102010042222 A1 | 4/2012 |
| DE | 102014224684 A1 | 6/2016 |
| EP | 0916525 A3 | 4/2002 |
| EP | 1400380 A2 | 3/2004 |
| EP | 1921340 B1 | 12/2010 |
| JP | H1113828 A | 1/1999 |
| JP | 2007153047 A | 6/2007 |
| JP | 4538776 B2 | 9/2010 |
| WO | 8900929 A1 | 2/1989 |
| WO | WO-9408806 A1 | 4/1994 |
| WO | 2016122337 A1 | 8/2016 |

\* cited by examiner

LEAF SPRING AND ACTUATOR CONTROL SYSTEMS AND METHODS

FIELD

The present disclosure relates to vehicle suspension systems including transverse leaf springs and more particularly to systems and methods for controlling a linear actuator to counteract bending and torsional modes of a leaf spring.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Shock absorbers (or dampers) are typically used in conjunction with automotive suspension systems or other suspension systems to absorb vibrations that occur during movement of the suspension system. In order to absorb these vibrations, automotive shock absorbers are generally connected between the sprung (body) and the unsprung (suspension/drivetrain) masses of a vehicle.

A transverse leaf spring arrangement, either structural, replacing a wishbone suspension, or in combination with a suspension system (e.g., double wishbone, MacPherson, multilink, etc.) may decrease road holding performance due to tire force variation. Variation is caused by the superimposed vibrations due to the bending and torsional vibration modes of the leaf spring.

SUMMARY

In a feature, a suspension system of a vehicle is described and includes: an unsprung mass of a vehicle; a sprung mass of the vehicle; at least one transverse leaf spring coupled between the unsprung mass of the vehicle and the sprung mass of the vehicle; and a linear actuator coupled in parallel with the at least one transverse leaf spring between the unsprung mass of the vehicle and the sprung mass of the vehicle and configured to modify vibrational characteristics of the vehicle.

In further features, the unsprung mass includes a wheel with an elastomeric tire, the elastomeric tire providing stiffness and damping between a road surface and the sprung mass of the vehicle.

In further features, a damper is coupled in parallel with the at least one transverse leaf spring and the linear actuator between the unsprung mass of the vehicle and the unsprung mass of the vehicle.

In further features, an actuator control module is configured to control a force applied by the linear actuator to modify the vibrational characteristics of the vehicle.

In further features, the actuator control module is configured to control the force applied by the linear actuator on the at least one transverse leaf spring based on a torsional mode of the at least one transverse leaf spring.

In further features, the actuator control module is configured to determine a target force to be applied by the linear actuator based on the torsional mode of the at least one transverse leaf spring and to control application of power to the linear actuator based on the target force.

In further features, a modes module is configured to determine the torsional mode of the at least one transverse leaf spring based on at least one of a position of the linear actuator, a velocity of the linear actuator, and an acceleration of the linear actuator.

In further features, the actuator control module is configured to control the force applied by the linear actuator on the at least one transverse leaf spring based on at least one of a position of the linear actuator, a velocity of the linear actuator, and an acceleration of the linear actuator.

In further features, the actuator control module is configured to control the force applied by the linear actuator on the at least one transverse leaf spring based on a bending mode of the at least one transverse leaf spring.

In further features, the actuator control module is configured to determine a target force to be applied by the linear actuator based on the bending mode of the at least one transverse leaf spring and to control application of power to the linear actuator based on the target force.

In further features, a modes module is configured to determine the bending mode of the at least one transverse leaf spring based on at least one of a position of the linear actuator, a velocity of the linear actuator, and an acceleration of the linear actuator.

In further features, the actuator control module is configured to control the force applied by the linear actuator on the at least one transverse leaf spring based on a bending mode of the at least one transverse leaf spring and a torsional mode of the at least one transverse leaf spring.

In further features, the linear actuator is a direct drive linear actuator.

In further features, the at least one transverse leaf spring includes: a first transverse leaf spring coupled between the unsprung mass of the vehicle and the sprung mass of the vehicle; and a second transverse leaf spring coupled between the unsprung mass of the vehicle and the sprung mass of the vehicle.

In further features: the first transverse leaf spring is a composite transverse leaf spring; and the second transverse leaf spring is a composite transverse leaf spring.

In further features: the first transverse leaf spring includes an upper A-arm leaf spring; and the second transverse leaf spring includes a lower A-arm leaf spring.

In a feature, a suspension system of a vehicle includes: at least one transverse leaf spring that extends transversely across the vehicle toward a wheel of the vehicle and that is coupled to a chassis of the vehicle; a linear actuator coupled to the chassis of the vehicle and to the at least one transverse leaf spring; and an actuator control module configured to control a force applied by the linear actuator on the at least one transverse leaf spring and to counteract vibrational modes of the at least one transverse leaf spring.

In further features, the actuator control module is configured to control the force applied by the linear actuator on the at least one transverse leaf spring based on a torsional mode of the at least one transverse leaf spring.

In further features, the actuator control module is configured to control the force applied by the linear actuator on the at least one transverse leaf spring based on a bending mode of the at least one transverse leaf spring.

In further features, the at least one transverse leaf spring includes: a first composite transverse leaf spring; and a second composite transverse leaf spring.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include dampers that damp motion of wheels. Vehicles may also include one or more transverse leaf springs that damp vertical motion of one or more wheels. Transverse leaf springs, however, may twist and bend and allow the associated wheel(s) to lose contact with the road.

According to the present disclosure, a linear actuator is coupled in parallel with a transverse leaf spring between a chassis of the vehicle and a wheel of the vehicle. An actuator control module controls force applied by the linear actuator to counteract bending and torsional modes of the linear actuator. This may increase contact between the wheel and the road surface.

Figure 1A:
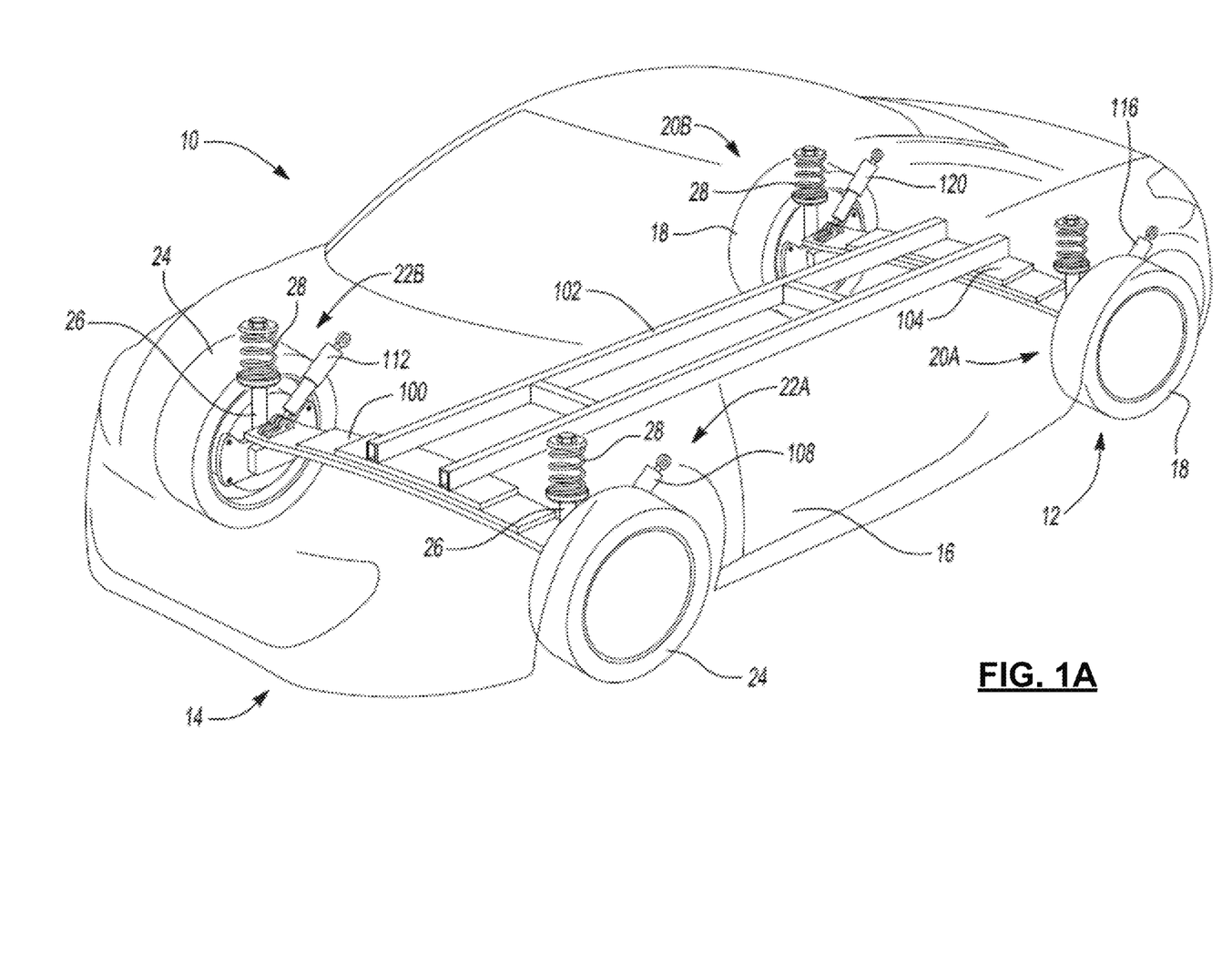
FIGS. 1A and 1B are illustrations of an example vehicle.

Referring to FIG. 1A, a vehicle 10 including a rear suspension 12, a front suspension 14, and a body 16 is illustrated. The rear suspension 12 may include a transversely extending rear axle assembly (not shown) adapted to operatively support the vehicle's rear wheels 18. The rear axle assembly may be operatively connected to the body 16 by two damper systems 20a and 20b. The body 16 is connected to a chassis 102 of the vehicle 10. In various implementations, the rear axle assembly may be omitted.

Similarly, the front suspension 14 may include a transversely extending front axle assembly (not shown) to operatively support the vehicle's front wheels 24. The front axle assembly may be operatively connected to the body 16 by another two damper systems 22a and 22b. In various implementations, the front axle assembly may be omitted.

The damper systems 20a, 20b, 22a, and 22b may include a damper 26, a helical coil spring 28. The dampers 26 may be active dampers or passive dampers. Although FIG. 1 illustrates a coil-over arrangement, different arrangements are possible, including arrangements where the same or similar damper systems are used at all four wheels (or corners) of the vehicle 10. In various implementations, the dampers 26 and springs 28 may be omitted.

While the example of a passenger car is shown, the present application is also applicable to other types of vehicles. The present application is also applicable to other types of applications such as vehicles incorporating independent front and/or independent rear suspension systems.

The term "damper system" as used herein refers to spring/damper systems in general and thus includes MacPherson struts.

The dampers 26 serve to dampen the relative motion of the unsprung portion of the front and rear suspension 14 and 12 and the sprung portion (including the body 16 and chassis 102) of the vehicle 10 by applying a damping force to the vehicle 10 that opposes the relative motion of the unsprung portion of the front and rear suspension 14 and 12 and the sprung portion of the vehicle 10. The coil springs 28 apply a biasing force to the sprung portion of the vehicle 10, which supports the sprung portion of the vehicle 10 on the unsprung portion of the front and rear suspension 14 and 12 in such a manner that bumps and other impacts are absorbed by the front and rear suspension 14 and 12.

Figure 1B:
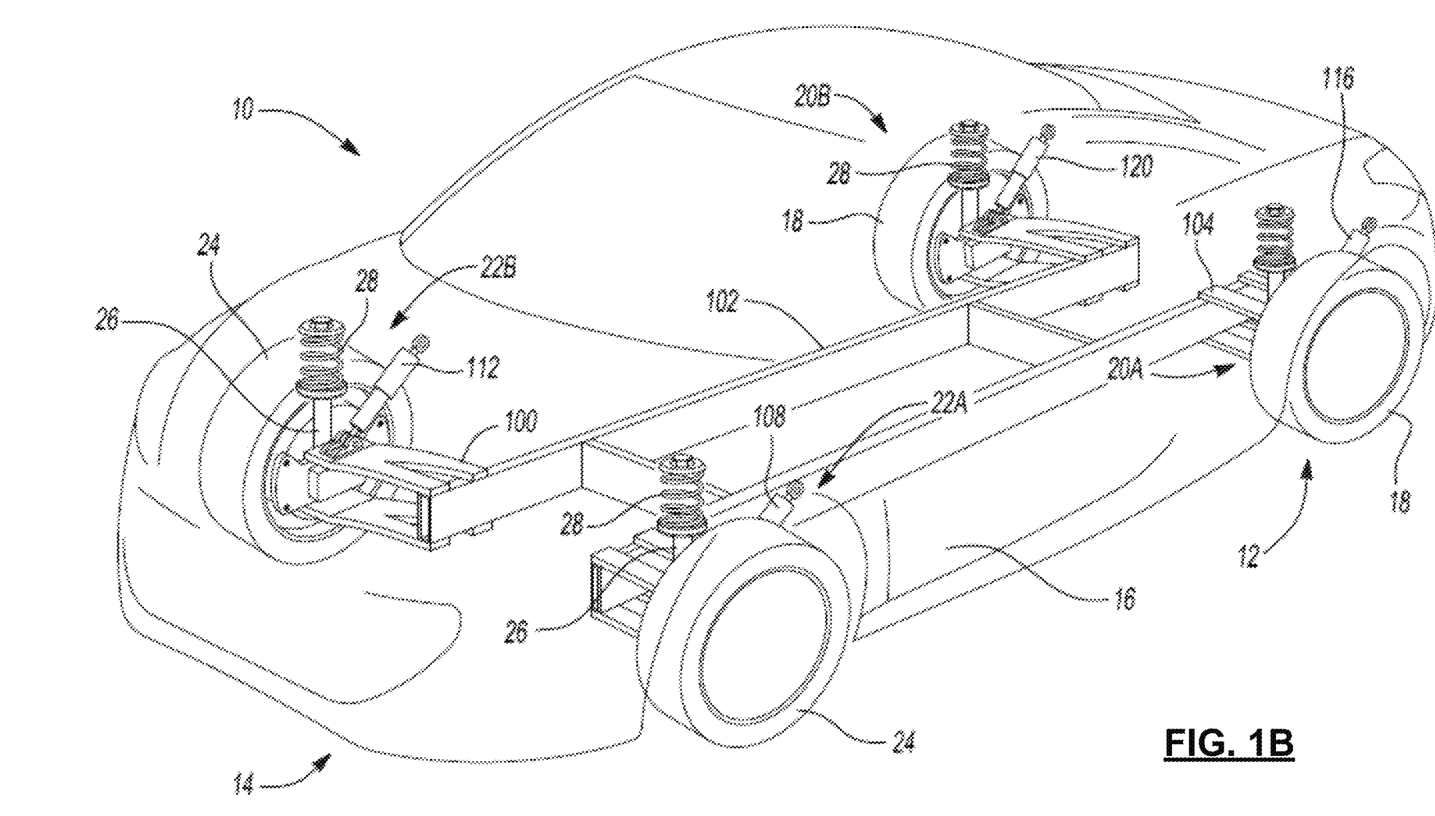

The vehicle also includes one or more transversely extending leaf springs. For example FIG. 1A illustrates a front transverse leaf spring 100 and a rear transverse leaf spring 104. FIG. 1B includes an example illustration of two-piece front transverse leaf springs 100 and two-piece rear transverse leaf springs 104. Two-piece transverse leaf springs include an upper portion (e.g., an upper A-arm) and a lower portion (e.g., a lower A-arm). In various implementations, the front transverse leaf spring(s) 100 may be omitted or the rear transverse leaf spring(s) 104 may be omitted. In various implementations (e.g., in the example of FIG. 1B), two half leaf spring assemblies may be provided in place of a transverse leaf spring. The front transverse leaf spring(s) 100 is/are coupled to the chassis 102 (e.g., via shackles) and to the front axle assembly near the front wheels 24 (e.g., via shackles). The rear transverse leaf spring(s) 104 is/are coupled to the chassis 102 (e.g., via shackles) and to the front axle assembly near the front wheels 24 (e.g., via shackles). As an alternative to the transverse leaf springs 100 and 104 being coupled to the front and rear axle assemblies, the transverse leaf springs 100 and 104 may be coupled to, for example, wheel (hub) assemblies of the wheels.

A first linear actuator module 108 is coupled at one end to the chassis 102 and at the other end to the location where one end of the front transverse leaf spring(s) 100 is/are connected to the left one of the front wheels 24. A second linear actuator module 112 is coupled at one end to the chassis 102 and at the other end to the location where one end of the front transverse leaf spring(s) 100 is/are connected to the right one of the front wheels 24.

A third linear actuator module 116 is coupled at one end to the chassis 102 and at the other end to the location where one end of the rear transverse leaf spring(s) 104 is/are connected to the left one of the rear wheels 18. A fourth linear actuator module 120 is coupled at one end to the chassis 102 and at the other end to the location where one end of the rear transverse leaf spring(s) 104 is/are connected to the right one of the rear wheels 18. The associated linear actuator modules may be omitted if a transverse leaf spring is omitted. The linear actuator modules may be, for example, direct drive linear actuators including linear electric motors. The linear actuator modules may be directly coupled to the chassis 102 or indirectly coupled to the chassis 102 via the chassis 102 being coupled to the body 16 and the linear actuator modules being coupled to the body 16.

The front and rear transverse leaf springs 100 and 104 may be composite leaf springs (i.e., made of composite material) or steel leaf springs. Composite leaf springs include layers of fiber oriented in a matrix.

Figure 2:
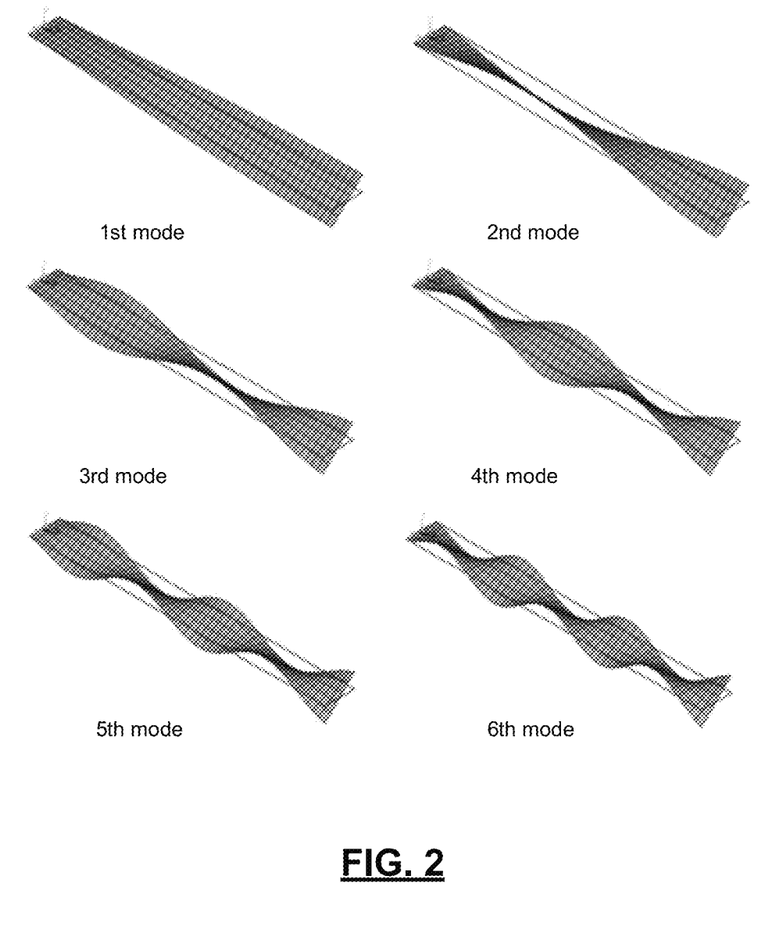
FIG. 2 illustrates example torsional modes of a beam, such as a transverse leaf spring.
Figure 3:
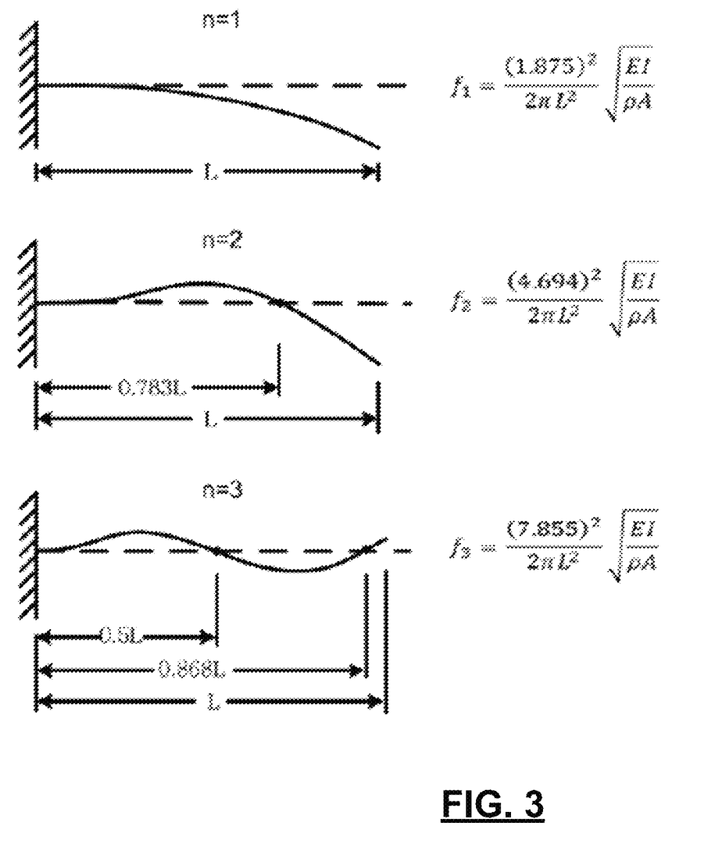
FIG. 3 illustrates example bending modes of a beam, such as a transverse leaf spring.

Transverse leaf springs bend and twist due to vertical motion of the wheels. FIG. 2 illustrates example torsional modes of a beam, such as a transverse leaf spring. FIG. 3 illustrates example bending modes of a beam, such as a transverse leaf spring. Bending and twisting of a transverse leaf spring may allow a wheel to lose contact with a road surface.

According to the present disclosure, a control module controls force applied by a linear actuator module based on the present bending and twisting modes of the associated transverse leaf spring. This counteracts the bending and twisting of the associated transverse leaf spring to increase contact between the wheel and the road surface.

Figure 4A:
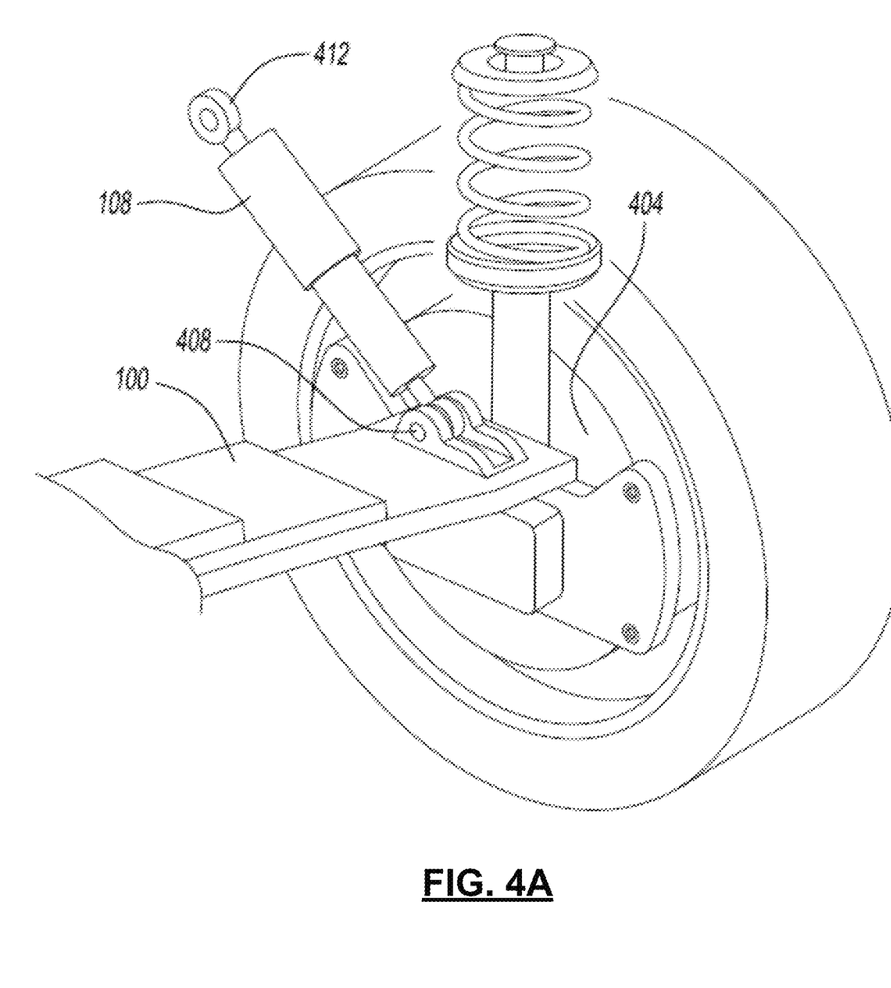
FIGS. 4A and 4B are views including example implementations including a transverse leaf spring and a linear actuator module.
Figure 4B:
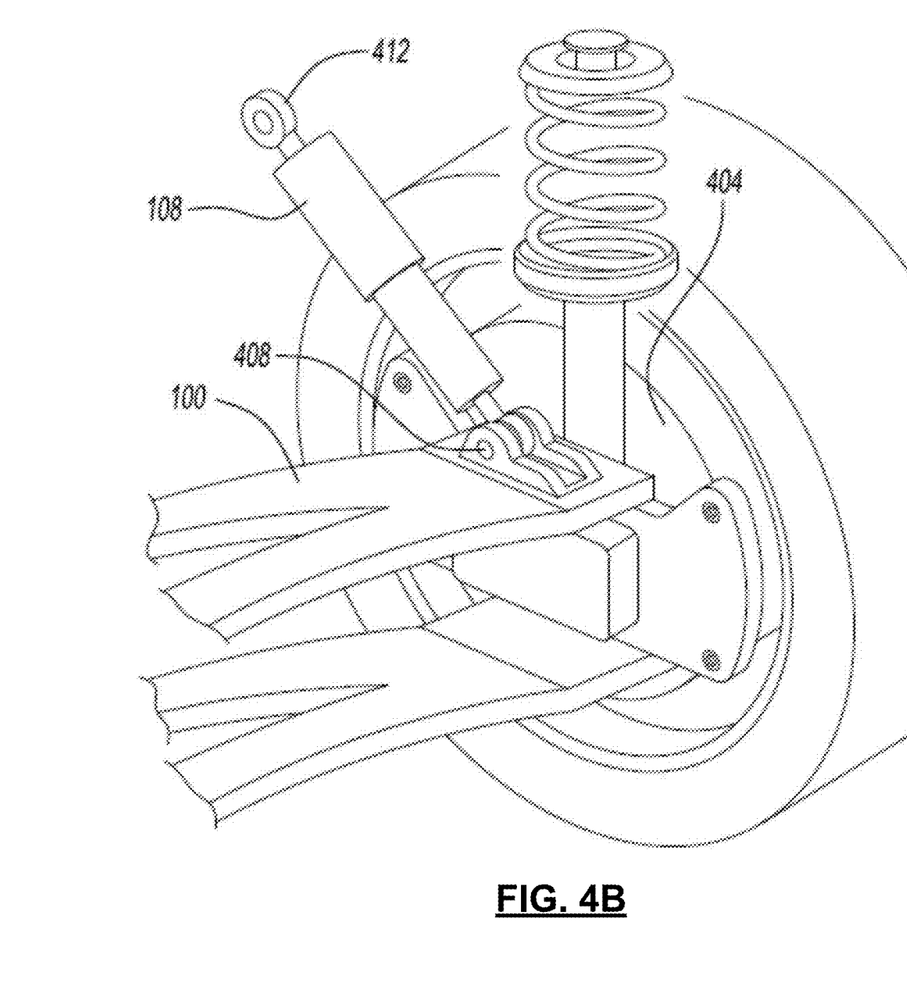

FIGS. 4A and 4B are views including example implementations including the front transverse leaf spring(s) 100 and the second linear actuator module 108. While the example of the front transverse leaf spring(s) 100 and the first linear actuator module 108 will be discussed in detail, the following is also applicable to the second, third, and fourth linear actuator modules 112, 116, and 120, and the rear transverse leaf spring 104.

As discussed above, a first end 404 of the front transverse leaf spring(s) 100 is coupled near the left one of the front wheels 24, such as to a wheel assembly of the left one of the front wheels 24 or to the front axle assembly. In the example of FIG. 4A, a second (the other) end of the front transverse leaf spring(s) 100 is coupled near the right one of the front wheels 24, such as to a wheel assembly of the right one of the front wheels 24 or to the front axle assembly. The front transverse leaf spring(s) 100 is/are also coupled to the chassis 102 of the vehicle. In various implementations, such as in the example of FIG. 4B, the front transverse leaf spring(s) 100 may be a half transverse leaf spring, and the second end(s) of the front transverse leaf spring(s) 100 may be coupled to the chassis 102 of the vehicle. In such implementations, another half transverse leaf spring is coupled between the chassis 102 and the right one of the front wheels 24.

A first end 408 of the first linear actuator module 108 is coupled at or near where the first end 404 of the front transverse leaf spring(s) 100 is coupled near the left one of the front wheels 24. A second end 412 of the first linear actuator module 108 is coupled (directly or indirectly) to the chassis 102 of the vehicle. The second end 412 of the first linear actuator module 108 is connected to a linear actuator of the first linear actuator module 108. The first linear actuator module 108 actuates (extends and retracts) the linear actuator to vary the force applied by the first linear actuator module 108 at the second end. The first linear actuator module 108 varies the force based on the present torsional and/or bending modes of the front transverse leaf spring(s) 100 to counteract bending and flexing of the front transverse leaf spring(s) 100. The position of the first linear actuator module 108 is depicted is only an example. The first end 408 of the first linear actuator 108 may be coupled to the front transverse leaf spring(s) 100 at various other locations across the span of the front transverse leaf spring(s) 100.

Figure 5:
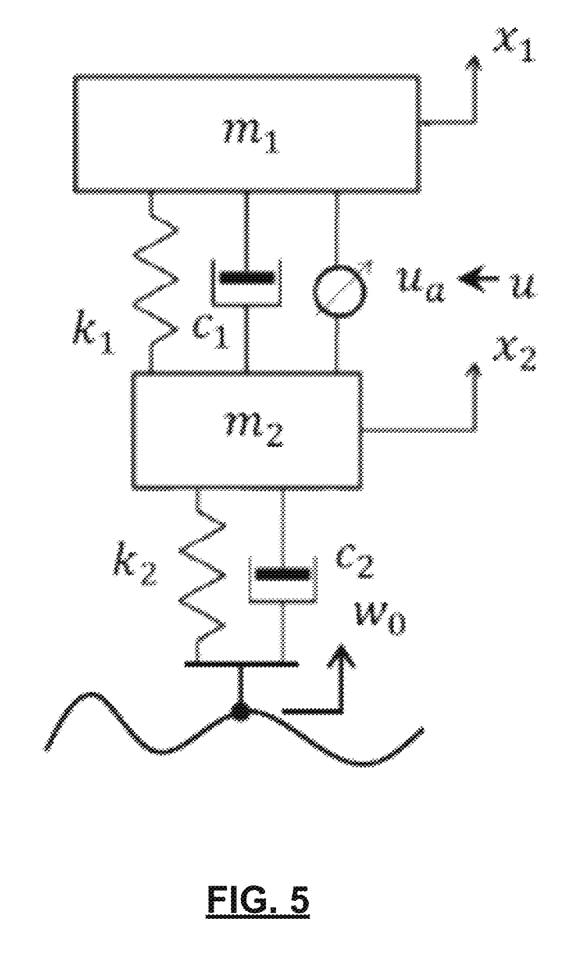
FIG. 5 is an illustration of a spring-mass damper model.

FIG. 5 is an illustration of a spring-mass damper model. In FIG. 5, $m_1$ represents the sprung mass of the vehicle (including the body 16 and the chassis 102), and $m_2$ represents the unsprung mass of the portion of the front suspension 14 associated with the left one of the front wheels 24. $k_1$ represents the vertical suspension stiffness including the mechanical characteristics of the front transverse leaf spring(s) 100. $c_1$ represents residual damping of the passive components including the front transverse leaf spring(s) 100 and the damper system 22a. $k_2$ and $c_2$ represent stiffness and damping provided by a tire (e.g., an elastomeric tire) of the left one of the front wheels 24. $c_2$ may be negligible in various implementations. $x_1$ and $x_2$ are vertical displacements of the sprung and unsprung masses. $w_o$ is the vertical displacement of the tire at the tire contact patch. $u_a$ represents the first linear actuator module 108.

Figure 6:
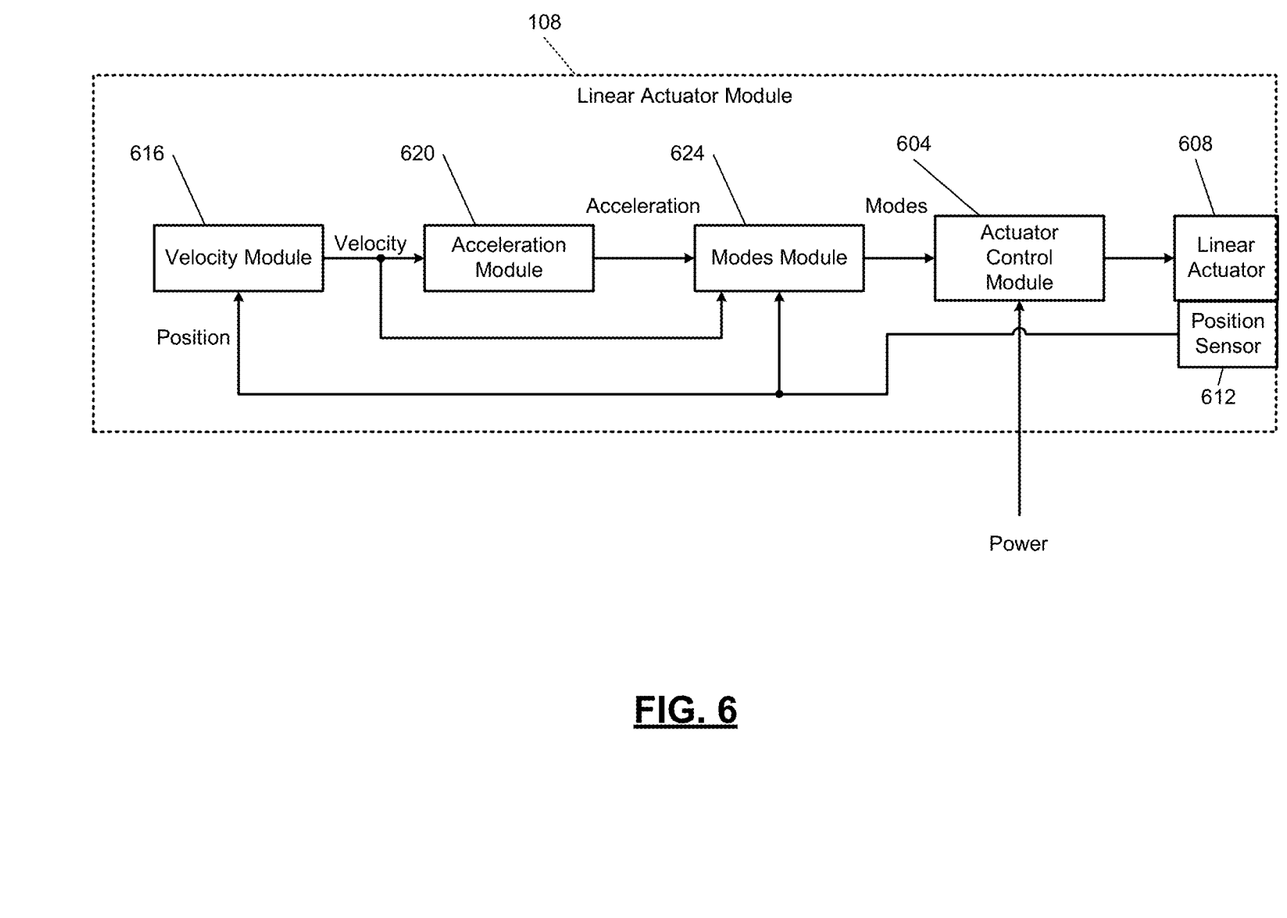
FIG. 6 is a functional block diagram of an example implementation of a linear actuator module.

FIG. 6 is a functional block diagram of an example implementation of the first linear actuator module 108. An actuator control module 604 controls actuation of a linear actuator 608 and a force applied by the linear actuator 608 to the location where the front transverse leaf spring(s) 100 is/are connected to the left one of the front wheels 24. The actuator control module 604 controls the application of electrical power (e.g., from a battery of the vehicle) to the linear actuator 608 to control actuation of the linear actuator 608 and the force applied by the linear actuator 608.

A position of the linear actuator 608 varies as the left one of the front wheels 24 moves vertically. A position sensor 612 measures a present position of the linear actuator 608. The position sensor 612 may update the present position at a predetermined rate. A velocity module 616 determines a present velocity of the linear actuator 608 based on changes in the present position over time. For example, the velocity module 616 may set the present velocity at a time based on or equal to a difference between the present position and a last value of the present position divided by the period between the time when the present position was obtained and the time when the last value of the present position was obtained. In various implementations, the velocity module 616 may determine the present velocity by determining a mathematical derivative of the present position with respect to time.

An acceleration module 620 determines a present acceleration of the linear actuator 608 based on changes in the present velocity over time. For example, the acceleration module 620 may set the present acceleration at a time based on or equal to a difference between the present velocity and a last value of the present velocity divided by the period between the time when the present velocity was obtained and the time when the last value of the present velocity was obtained. In various implementations, the acceleration module 620 may determine the present acceleration by determining a mathematical derivative of the present velocity with respect to time.

A modes module 624 determines a present torsional mode of the front transverse leaf spring(s) 100 and a present bending mode of the front transverse leaf spring(s) 100. The modes module 624 determines the present torsional mode and the present bending based on at least one of the position of the linear actuator 608, the velocity of the linear actuator 608, and the acceleration of the linear actuator 608. The modes module 624 may determine the present torsional mode, for example, using a lookup table that relates position, velocity, and/or acceleration to present torsional modes. The modes module 624 may determine the present bending mode, for example, using a lookup table that relates position, velocity, and/or acceleration to present torsional modes.

The actuator control module 604 determines a target force to be applied by the linear actuator 608 based on the bending mode and the torsional mode of the front transverse leaf spring(s) 100. The actuator control module 604 may determine the target force, for example, using a lookup table that relates bending modes and torsional modes to target forces. The lookup table may be calibrated based on counteracting or canceling the bending modes and torsional modes.

In various implementations, the actuator control module 604 may determine the target force to be applied by the linear actuator 608 based on the position, velocity, and/or present acceleration. The actuator control module 604 may determine the target force, for example, using a lookup table that relates position, velocity, and/or acceleration to target force. The lookup table may be calibrated based on counteracting or adjusting the position toward a predetermined position, the velocity toward a predetermined velocity (e.g., zero), and/or adjusting the acceleration toward a predetermined acceleration (e.g., zero).

The actuator control module 604 controls the force applied by the linear actuator 608 to achieve the target force. For example, the actuator control module 604 applies power to the linear actuator 608 to achieve the target force. While the example of the front transverse leaf spring(s) 100 is provided, the present disclosure is also applicable to the rear transverse leaf spring 104. Also, while the velocity, acceleration, modes, and actuator control modules 616, 620, 624, and 604 are shown and described as being implemented within the linear actuator module 108, one or more of these modules may be implemented separately or within another module.

Figure 7:
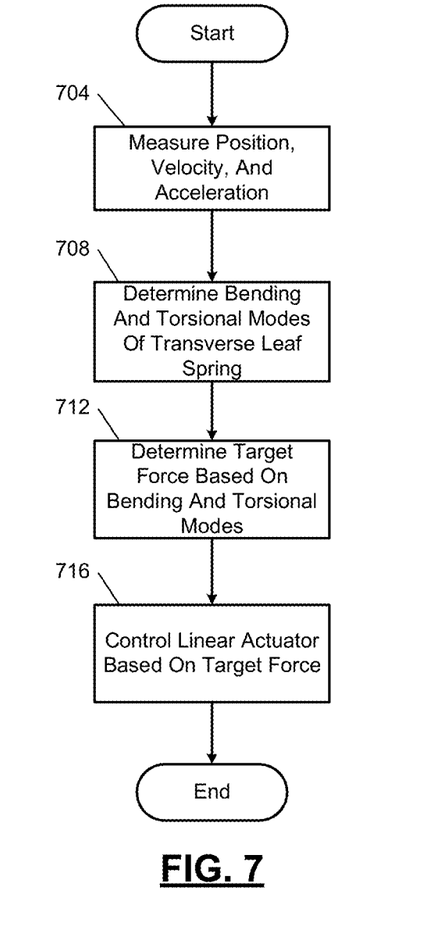
FIG. 7 is a flowchart depicting an example method of counteracting or cancelling bending and torsional modes of one or more transverse leaf springs coupled to a wheel.

FIG. 7 is a flowchart depicting an example method of counteracting or cancelling bending and torsional modes of a transverse leaf spring. Control may begin with 704 where the position sensor 612 determines the position of the linear actuator 608 associated with the transverse leaf spring, the velocity module 616 determines the velocity of the linear actuator 608, and the acceleration module 620 determines the acceleration of the linear actuator 608.

At 708, the modes module 624 determines the torsional and bending modes of the transverse leaf spring based on at least one of the position, velocity, and acceleration of the linear actuator 608. At 712, the actuator control module 604 determines the target force of the linear actuator 608 to counteract the torsional and bending modes of the transverse leaf spring. At 716, the actuator control module 604 controls the linear actuator 608 based on the target force to counteract or cancel the torsional and bending modes of the transverse leaf spring. While control is shown as ending, control may return to 704.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A suspension system of a vehicle, comprising:
   an unsprung mass of a vehicle;
   a sprung mass of the vehicle;
   at least one transverse leaf spring coupled between the unsprung mass of the vehicle and the sprung mass of the vehicle;
   a linear actuator coupled in parallel with the at least one transverse leaf spring between the unsprung mass of the vehicle and the sprung mass of the vehicle and configured to modify vibrational characteristics of the vehicle;
   a modes module configured to determine at least one of (a) a torsional mode of the at least one transverse leaf spring and (b) a bending mode of the at least one transverse leaf spring; and
   an actuator control module configured to control a force applied by the linear actuator based on the at least one of (a) the torsional mode of the at least one transverse leaf spring and (b) the bending mode of the at least one transverse leaf spring.

2. The suspension system of claim 1 wherein the unsprung mass includes a wheel with an elastomeric tire, the elastomeric tire providing stiffness and damping between a road surface and the sprung mass of the vehicle.

3. The suspension system of claim 1 further comprising a damper coupled in parallel with the at least one transverse leaf spring and the linear actuator between the unsprung mass of the vehicle and the unsprung mass of the vehicle.

4. The suspension system of claim 1 wherein the actuator control module is configured to control the force applied by the linear actuator on the at least one transverse leaf spring based on at least the torsional mode of the at least one transverse leaf spring.

5. The suspension system of claim 4 wherein the actuator control module is configured to determine a target force to be applied by the linear actuator based on the torsional mode of the at least one transverse leaf spring and to control application of power to the linear actuator based on the target force.

6. The suspension system of claim 5 wherein the modes module is configured to determine the torsional mode of the at least one transverse leaf spring based on at least one of a position of the linear actuator, a velocity of the linear actuator, and an acceleration of the linear actuator.

7. The suspension system of claim 1 wherein the actuator control module is configured to control the force applied by the linear actuator on the at least one transverse leaf spring based on both the bending mode of the at least one transverse leaf spring and the torsional mode of the at least one transverse leaf spring.

8. The suspension system 1 wherein the linear actuator is a direct drive linear actuator.

9. The suspension system of claim 1 wherein the at least one transverse leaf spring includes:
   a first transverse leaf spring coupled between the unsprung mass of the vehicle and the sprung mass of the vehicle; and
   a second transverse leaf spring coupled between the unsprung mass of the vehicle and the sprung mass of the vehicle.

10. The suspension system of claim 9 wherein:
    the first transverse leaf spring is a composite transverse leaf spring; and
    the second transverse leaf spring is a composite transverse leaf spring.

11. The suspension system of claim 9 wherein:
    the first transverse leaf spring includes an upper A-arm leaf spring; and
    the second transverse leaf spring includes a lower A-arm leaf spring.

12. A suspension system of a vehicle, comprising:
    an unsprung mass of a vehicle;
    a sprung mass of the vehicle;
    at least one transverse leaf spring coupled between the unsprung mass of the vehicle and the sprung mass of the vehicle;
    a linear actuator coupled in parallel with the at least one transverse leaf spring between the unsprung mass of the vehicle and the sprung mass of the vehicle and configured to modify vibrational characteristics of the vehicle;
    a modes module configured to determine at least one of (a) a torsional mode of the at least one transverse leaf spring and (b) a bending mode of the at least one transverse leaf spring; and
    an actuator control module configured to control a force applied by the linear actuator based on the at least one of (a) the torsional mode of the at least one transverse leaf spring and (b) the bending mode of the at least one transverse leaf spring, wherein the actuator control module is configured to control the force applied by the linear actuator on the at least one transverse leaf spring based on at least the bending mode of the at least one transverse leaf spring.

13. The suspension system of claim 12 wherein the actuator control module is configured to determine a target force to be applied by the linear actuator based on the bending mode of the at least one transverse leaf spring and to control application of power to the linear actuator based on the target force.

14. The suspension system of claim 13 wherein the modes module is configured to determine the bending mode of the at least one transverse leaf spring based on at least one of a position of the linear actuator, a velocity of the linear actuator, and an acceleration of the linear actuator.

15. A suspension system of a vehicle, comprising:
at least one transverse leaf spring that extends transversely across the vehicle toward a wheel of the vehicle and that is coupled to a chassis of the vehicle;
a linear actuator coupled to the chassis of the vehicle and to the at least one transverse leaf spring; and
an actuator control module configured to control a force applied by the linear actuator on the at least one transverse leaf spring based on at least one of: (a) a determined torsional mode of the at least one transverse leaf spring, (b) a determined bending mode of the at least one torsional leaf spring, (c) a position of the linear actuator, (d) a velocity of the linear actuator, and (e) an acceleration of the linear actuator, wherein the actuator control module controls the force applied by the linear actuator on the at least one transverse leaf spring based on at least the determined torsional mode of the at least one transverse leaf spring.

16. The suspension system of claim 15 wherein the at least one transverse leaf spring includes:
a first composite transverse leaf spring; and
a second composite transverse leaf spring.

17. A suspension system of a vehicle, comprising:
at least one transverse leaf spring that extends transversely across the vehicle toward a wheel of the vehicle and that is coupled to a chassis of the vehicle;
a linear actuator coupled to the chassis of the vehicle and to the at least one transverse leaf spring; and
an actuator control module configured to control a force applied by the linear actuator on the at least one transverse leaf spring based on at least one of: (a) a determined torsional mode of the at least one transverse leaf spring, (b) a determined bending mode of the at least one torsional leaf spring, (c) a position of the linear actuator, (d) a velocity of the linear actuator, and (e) an acceleration of the linear actuator, wherein the actuator control module controls the force applied by the linear actuator on the at least one transverse leaf spring based on at least the determined bending mode of the at least one transverse leaf spring.

* * * * *